United States Patent
Blythe et al.

(10) Patent No.: US 7,898,505 B2
(45) Date of Patent: Mar. 1, 2011

(54) DISPLAY SYSTEM

(75) Inventors: Michael M. Blythe, Albany, OR (US); Gregory W. Blythe, Philomath, OR (US); Wyatt A. Huddleston, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1948 days.

(21) Appl. No.: 11/003,726

(22) Filed: Dec. 2, 2004

(65) Prior Publication Data

US 2006/0119541 A1  Jun. 8, 2006

(51) Int. Cl.
*G09G 3/00* (2006.01)

(52) U.S. Cl. ......... 345/30; 345/156; 345/179; 178/19.05

(58) Field of Classification Search .................... 345/30, 345/157, 173, 179; 178/18.01–18.09, 19.01–19.06
See application file for complete search history.

(56) References Cited

U.S. PATENT DOCUMENTS

| | | | |
|---|---|---|---|
| 4,009,339 A * | 2/1977 | Anderson et al. | 178/18.02 |
| 4,268,826 A | 5/1981 | Scott et al. | |
| 5,341,155 A * | 8/1994 | Elrod et al. | 345/179 |
| 5,495,269 A * | 2/1996 | Elrod et al. | 345/179 |
| 5,502,514 A * | 3/1996 | Vogeley et al. | 348/771 |
| 5,652,602 A | 7/1997 | Fishman et al. | |
| 5,771,039 A * | 6/1998 | Ditzik | 345/178 |
| 6,377,249 B1 | 4/2002 | Mumford | |
| 6,414,672 B2 * | 7/2002 | Rekimoto et al. | 345/173 |
| 6,545,660 B1 * | 4/2003 | Shen et al. | 345/156 |
| 6,622,919 B1 | 9/2003 | Wilz et al. | |
| 6,708,883 B2 | 3/2004 | Krichever | |
| 6,795,060 B2 * | 9/2004 | Rekimoto et al. | 345/173 |
| 7,190,336 B2 * | 3/2007 | Fujisawa | 345/81 |
| 2004/0001082 A1 | 1/2004 | Said | |
| 2004/0125053 A1 * | 7/2004 | Fujisawa | 345/76 |
| 2005/0183035 A1 * | 8/2005 | Ringel et al. | 715/811 |

FOREIGN PATENT DOCUMENTS

| | | |
|---|---|---|
| DE | 101 63 647 A1 | 7/2003 |
| EP | 1 168 232 A | 1/2002 |
| WO | WO 2005/101173 A | 10/2005 |

\* cited by examiner

*Primary Examiner* — Stephen G Sherman (57) ABSTRACT

A display system includes a display, and a projection device configured to project, substantially simultaneously, image pixels onto the display and an optical signal encoding data onto the display.

32 Claims, 8 Drawing Sheets

DISPLAY SYSTEM

BACKGROUND

Interactive electronic display surfaces allow human users to utilize the display surface as a mechanism both for viewing content, such as computer graphics, video, etc., as well as inputting information into the system.

Many interactive display surfaces are configured to receive input data through a coupled communication device. If multiple input devices were to provide input at the same time, errors would likely occur because the interactive display device would not be able to discern one input device from another.

BRIEF DESCRIPTION OF THE DRAWINGS

The accompanying drawings illustrate various exemplary embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary system and method for transferring information to a data-receiving device through a display surface is disclosed herein. More specifically, a system and a method are disclosed that facilitate optical communication between a system controller or processor and a data-receiving device utilizing the pixels or display surface of a projection device as a communication medium. The optical communication, along with a feedback methodology, enables the interactive display system to provide data transfer with one or more data-receiving devices simultaneously. The display surface may be a glass surface configured to display an optical light image generated by a digital light projector (DLP), a liquid crystal display (LCD), or any other projection device or surface, in response to digital signals from the controller. The data-receiving devices may take various forms, such as pointing devices, cellular telephones, game pieces, MP3 players, digital cameras, computer mice, or any other electronic device that includes an optical receiver and a data storage component.

The DLP or other light projection panel detects the presence of a data-receiving device and then selectively projects a series of pixels, such as visible pixels in one embodiment, to a localized area of the display surface corresponding to the position of the data-receiving device on the light projection panel, thereby providing optical data to the optically coupled data-receiving device. The optical data transfer signals are difficult to view by a user and do not significantly affect the user's experience because the signal transmitting pixels are substantially obscured by the body of the data-receiving device, yet they are detectable by the optical receivers within the data-receiving device.

Simultaneous or substantially simultaneous with the optical data transfer, the light projection panel may generate image pixels in the form of a continuous moving video or graphic, such as a movie video, a video game, computer graphics, Internet Web pages, etc. on the display surface. Projecting image pixels substantially simultaneously with the optical data transfer refers to the optical data transfer occurring in a time interval in which projection of image pixels on the display surface may also occur. To locate the physical positions of data-receiving devices on the display surface, the controller can transmit a positioning signal, such as a subliminal positioning signal in one embodiment, over the display surface, using various methodologies. When a data-receiving device receives the subliminal positioning signal, the data-receiving device can send a feedback signal (using various techniques) to the controller to allow unique identification of the data-receiving device, effectively establishing a "handshake" between the controller and the particular data-receiving device. As a result of the feedback signals, the controller knows where each of the data-receiving devices is located on the display surface and can individually establish simultaneous optical communication with the data-receiving devices. Once the controller knows where the different data-receiving devices on the display surface are located, various actions can be taken, including effecting communication between the controller and the data-receiving devices, as well as effecting communication between the various data-receiving devices through the controller.

In the following description, for purposes of explanation, numerous specific details are set forth in order to provide a thorough understanding of the present system and method for transferring information to a data-receiving device through a display surface. However, the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
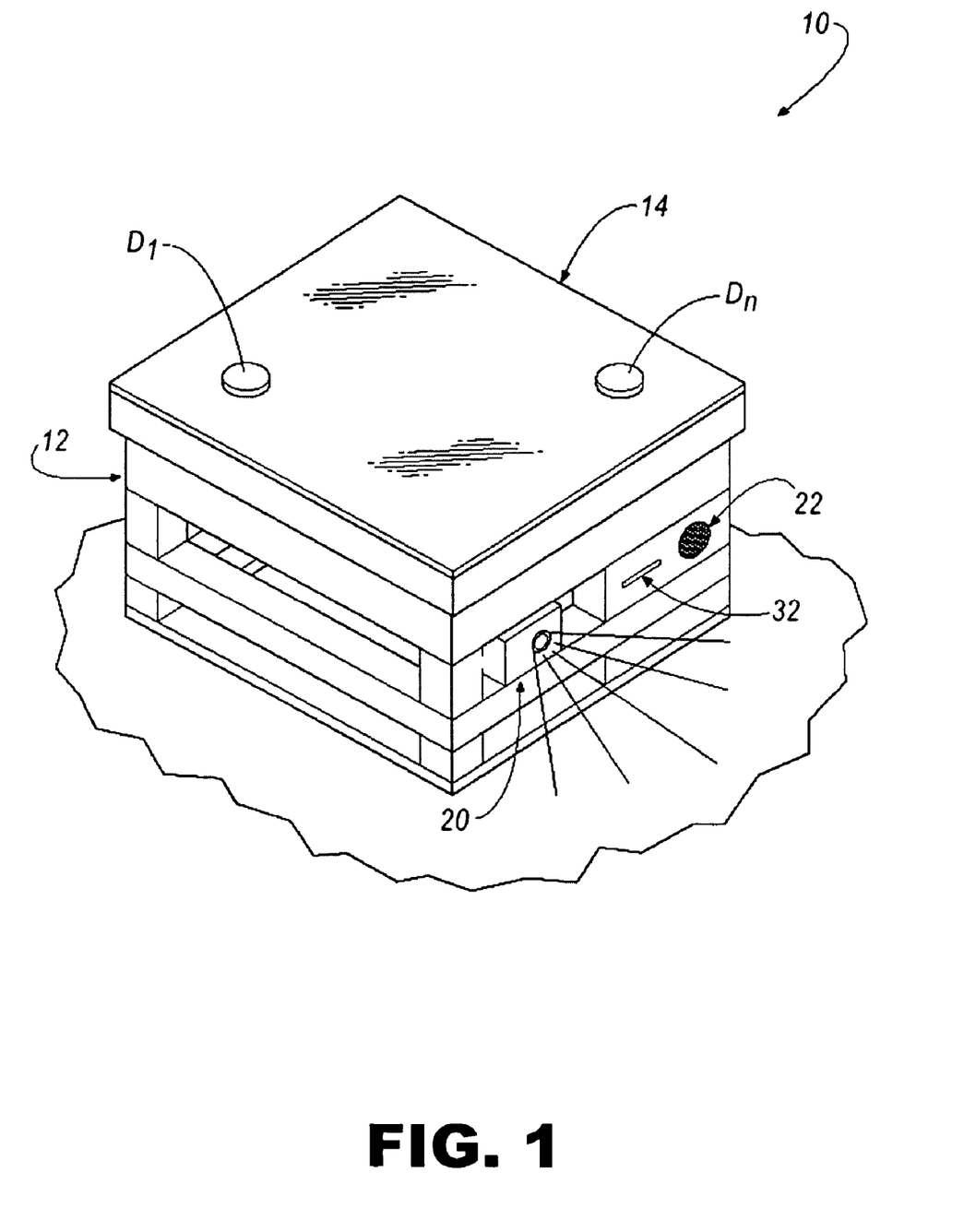
FIG. 1 is a perspective view of an exemplary interactive display system, according to one exemplary embodiment.
Figure 2:
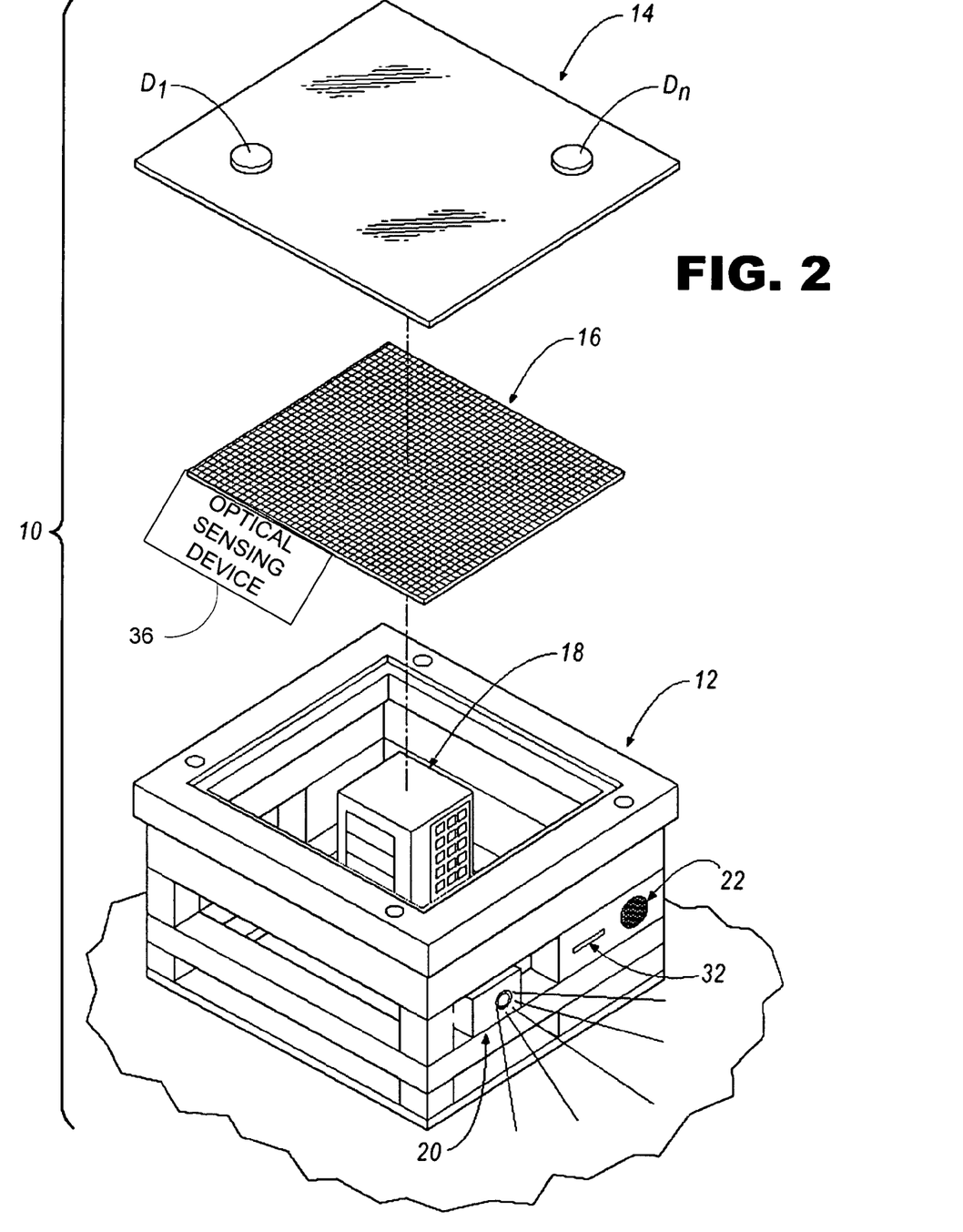
FIG. 2 is an exploded perspective view of the interactive display system in FIG. 1, according to one exemplary embodiment.

Referring now to FIGS. 1 and 2, an interactive display system (10) is shown according to one exemplary embodiment. According to the exemplary embodiment illustrated in FIGS. 1 and 2, the interactive display system (10) is shown as embodied in a "table" (12), with the table surface functioning as the display surface (14). According to the exemplary configuration illustrated in FIGS. 1 and 2, multiple users (each having his/her own data-receiving device ($D_1$-$D_n$) can view and access the display surface (14) by sitting around the table (12). While the present exemplary system and method are described in the context of an interactive display system (10)

embodied in a table (12), the physical embodiment of the display system can take any number of forms other than that of a "table."

Continuing with reference to FIGS. 1 and 2, the exemplary interactive display system (10) includes a display surface (14), a digital light processor (DLP) (16) or other projection device, an optical sensing device (36), and a controller (18). According to one exemplary embodiment, the controller (18) is configured to generate electrical image signals indicative of viewable images, such as computer graphics, movie video, video games, Internet Web pages, etc., which are provided for generation to the DLP (16). The controller (18) can take multiple forms, such as a personal computer, microprocessor, or other electronic devices capable of providing image signals to a DLP. The DLP (16), in response to the electrical signals, generates digital optical (viewable) images on the display surface (14). The controller (18) may receive data and other information to generate the image signals from various sources, such as hard drives, CD or DVD ROMs (32), computer servers, local and/or wide area networks, and the Internet, for example. The controller (18) may also provide additional output in the form of projected images from an auxiliary projector (20) and sound from a speaker (22).

As shown in FIGS. 1 and 2, the interactive display system (10) can include a variety of other components, such as a projector (20), configured to simultaneously project the content of the display surface (14) onto a wall-mounted screen, for example. The interactive display system (10) may also include one or more speakers (22) for producing audible sounds that accompany the visual content on the display surface (14). Further, the interactive display system (10) may include one or more devices for storing and retrieving data, such as a CD or DVD ROM drive, disk drives, USB flash memory ports, etc.

While the interactive display system (10) is described above in the context of a display device including a DLP (16), the present systems and methods are in no way limited to transferring information to a data-receiving device through a display surface using a DLP (16) display device. Rather, any number of projection panel display devices having addressable pixels may be used to transfer data according to the present exemplary embodiment including, but in no way limited to, a liquid crystal display (LCD), a plasma display, or a flat panel display. Further, while the above-mentioned display surface (14) is configured to display viewing images in addition to the data being transferred, the present systems and methods may be incorporated by a display device that is solely configured to display optical data for transfer to an optical data-receiving device ($D_1$-$D_n$), without regard to the display of viewing images.

According to the exemplary embodiment illustrated in FIGS. 1 and 2, the DLP (16) may assume a variety of forms. In general, the DLP (16) generates a viewable digital image on the display surface (14) by projecting a plurality of pixels of light onto the display surface (14). Each viewable image may be made up of millions of pixels, a fewer number pixels, or a greater number of pixels. Each pixel is individually controlled and addressable by the DLP (16) to have a certain color (or grey-scale). The combination of many light pixels of different colors (or grey-scales) on the display surface (14) generates a viewable image or "frame." Continuous video and graphics may be generated by sequentially combining frames together, as in a motion picture.

One embodiment of a DLP (16) includes a digital micro-mirror device (DMD) configured to vary the projection of light pixels onto the display surface (14). Other embodiments could include, but are in no way limited to, diffractive light devices (DLD), liquid crystal on silicon devices (LCOS), plasma displays, and liquid crystal displays. Additionally, other spatial light modulator and display technologies could be substituted for the DLP (16) without varying from the scope of the present system and method.

Figure 3:
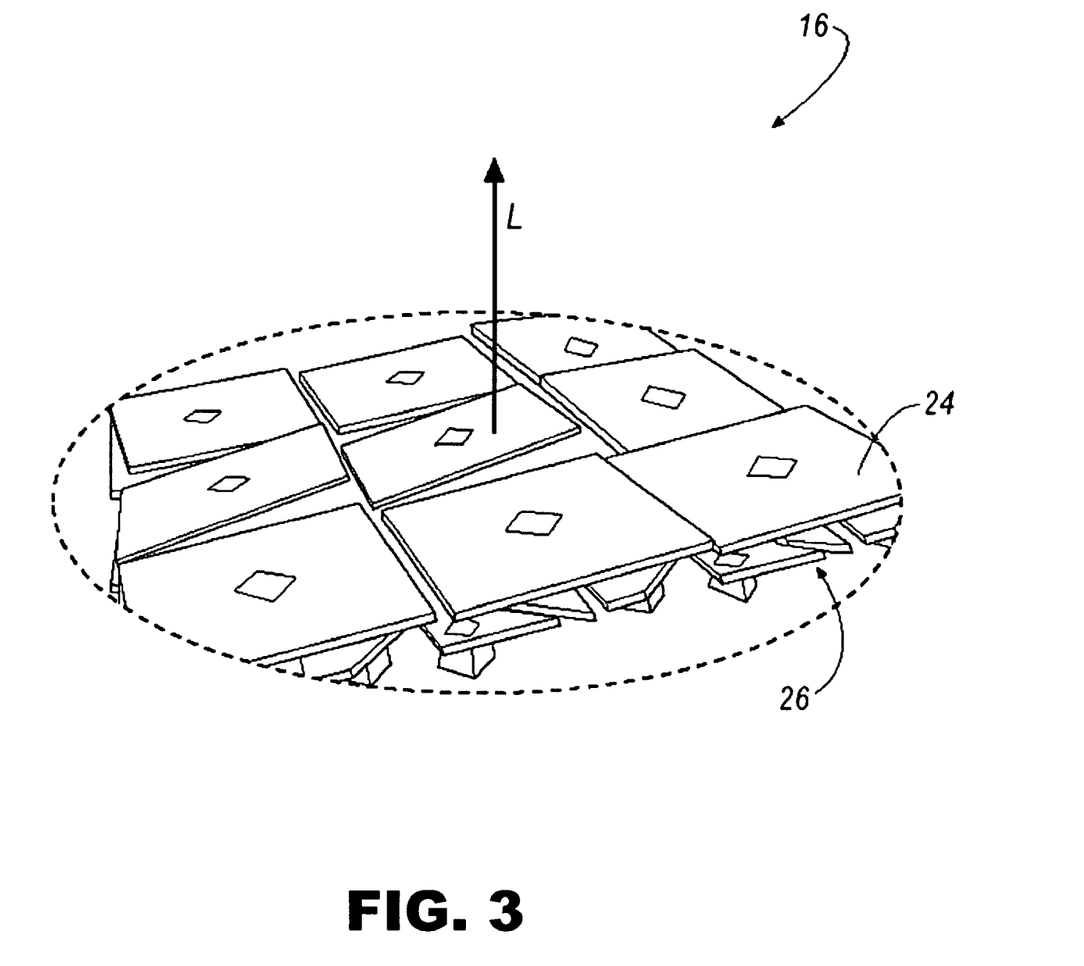
FIG. 3 is a close-up perspective view of a portion of an exemplary digital light processor, according to one exemplary embodiment.

FIG. 3 is a close-up view of a portion of an exemplary DMD, according to one exemplary embodiment. As shown in FIG. 3, the DMD includes an array of micro-mirrors (24) individually mounted on hinges (26). Each micro-mirror (24) corresponds to one pixel in an image projected on the display surface (14). The controller (18; FIG. 2) provides light modulation signals indicative of a desired viewable image or optical data stream to the DLP (16). In response to the received signals, the DLP (16) causes each micro-mirror (24) of the DMD to modulate light (L) to generate an all-digital image onto the display surface (14). Specifically, the DLP (16) causes each micro-mirror (24) to repeatedly tilt toward or away from a light source (not shown) in response to the image signals from the controller (18), effectively turning the particular pixel associated with the micro-mirror "on" and "off", which normally occurs thousands of times per second. When a micro-mirror (24) is switched on more frequently than off, a light gray pixel is projected onto the display surface (14). Conversely, when a micro-mirror (24) is switched off more frequently than on, a darker gray pixel is projected. A color wheel (not shown) may also be used to create a color image. The individually light-modulated pixels may be configured to form a viewable image or frame on the display surface (14).

Figure 4:
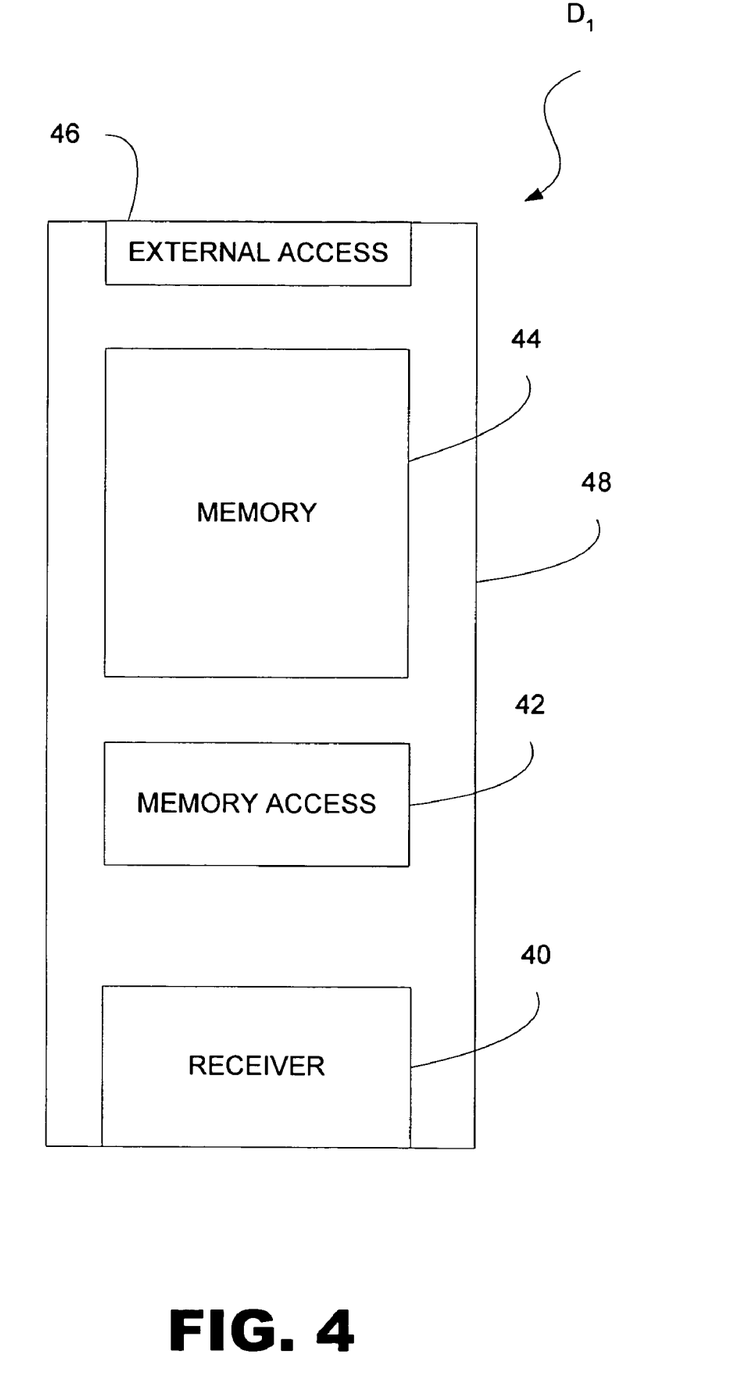
FIG. 4 is a simple block diagram illustrating the components of a data-receiving device, according to one exemplary embodiment.
Figure 5:
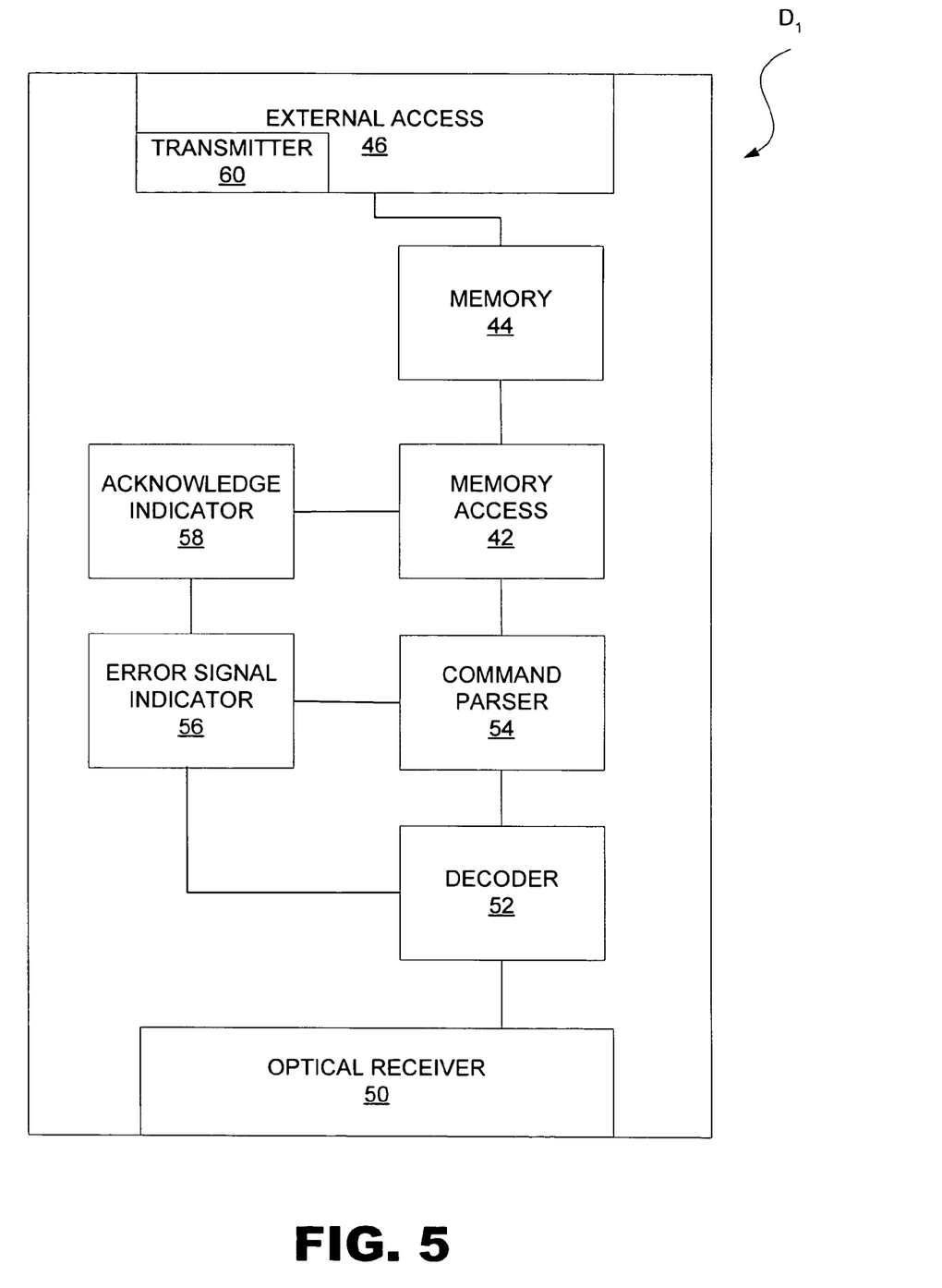
FIG. 5 is detailed block diagram illustrating the components of a data-receiving device, according to one exemplary embodiment.

Returning again to FIGS. 1 and 2, the interactive display system (10) further includes one or more optical data-receiving devices, shown in FIGS. 1 and 2 as elements ($D_1$) and ($D_N$). The optical data-receiving devices ($D_1$, $D_N$) can take a variety of physical forms, such as pointing devices (computer mouse, white board pen, etc.), gaming pieces, multimedia devices, and the like. FIGS. 4 and 5 further illustrate the components of the optical data-receiving devices ($D_1$-$D_N$). As shown in FIG. 4, the optical data-receiving device ($D_1$) has an outer housing (48) and includes a receiver (40), a memory access component (42), a memory component (44), and one or more external access components (46). Further details of each of the above-mentioned components will be given below with reference to FIG. 5.

As shown in FIG. 5, the receiver (40; FIG. 4) is illustrated as an optical receiver (50). According to one exemplary embodiment, the optical receiver (50) is configured to receive optical signals from the DLP (16) through the display surface (14). For example, the optical receiver may be a photo receptor such as a photocell, a photo diode, a charge coupled device (CCD), or any other optical signal receiving device embedded at a suitable location in the data-receiving device ($D_1$). In one embodiment, the optical receiver may be embedded in the bottom of data-receiving device ($D_1$). Further, in another exemplary embodiment, each input device may include a light filter that only allows light of a certain color or intensity to pass through, thereby allowing the system to receive the encoded optical signals from the DLP (16).

A decoder (52) and a command parser (54) are also illustrated in FIG. 5 as being communicatively coupled to the optical receiver (50). The decoder (52) and command parser (54) may be any number of electrical components configured to interpret the received optical signals including, but in no way limited to, application specific integrated circuits (ASIC) or a microcontroller.

Further, FIG. 5 illustrates the memory access component (42) receiving the output of the decoder (52) and command parser (54). According to one exemplary embodiment, the memory access component (42) may be any device configured to receive and format data, as well as perform read memory and write memory functions. Accordingly, the memory access component (42) may include, but is in no way limited to, a memory access ASIC or a processor.

The memory component (44) of the optical data-receiving device ($D_1$) is configured to receive and selectively store the output of the memory access component (42). According to one exemplary embodiment, the memory component (44) may be any memory storage device including, but in no way limited to, read only memory (ROM), random access memory (RAM), flash memory, virtual memory, and the like.

The external access component (46) of the data-receiving device ($D_1$) is configured to allow a user to access data saved in the memory component (44). Accordingly, any number of external access components (46) may be included in the data-receiving device ($D_1$) including, but in no way limited to an earphone jack, a speaker jack, an infrared transmitter, a radio frequency transmitter, a speaker, a motion actuator, a light source, a keystone jack, a universal serial bus (USB) port, a serial port, and/or a wireless transmitter (60). According to one exemplary embodiment, the wireless transmitter (60) illustrated in FIG. 5 is configured to transmit data to an external receiving device, such as the controller (18; FIG. 2). Accordingly, the wireless transmitter (60) can take many forms including, but in no way limited to, a radio frequency (RF, such as Bluetooth™) transmitter, an infrared (IR) transmitter, an optical transmitter, etc. As will be explained in further detail below, the incorporation of a wireless transmitter (60) allows the data-receiving devices ($D_1$-$D_N$) to communicate their respective positions to the controller (18; FIG. 2) or with other data-receiving devices ($D_1$-$D_N$) through the display surface (14), as will be further developed below.

FIG. 5 also illustrates a number of components of the data-receiving device ($D_1$) not represented in FIG. 4, including an error signal indicator (56) and an acknowledge indicator (58). According to the exemplary embodiment illustrated in FIG. 5, the error signal indicator (56) may be configured to indicate to a user when an error occurs in the reception or decoding of an optical signal from the display surface (14). Further, the acknowledge indicator (58) may be configured to confirm a successful reception of data from the display surface (14). The error signal indicator (56) and the acknowledge indicator (58) may each be individual indicators or a shared indicator configured to produce a separate signal depending on whether an error or acknowledgement is to be conveyed to the user. According to one exemplary embodiment, the error signal indicator (56) and the acknowledge indicator (58) may include, but are in no way limited to, a light emitting device such as a light emitting diode (LED) or an audible signal emitting device such as a speaker.

Figure 6:
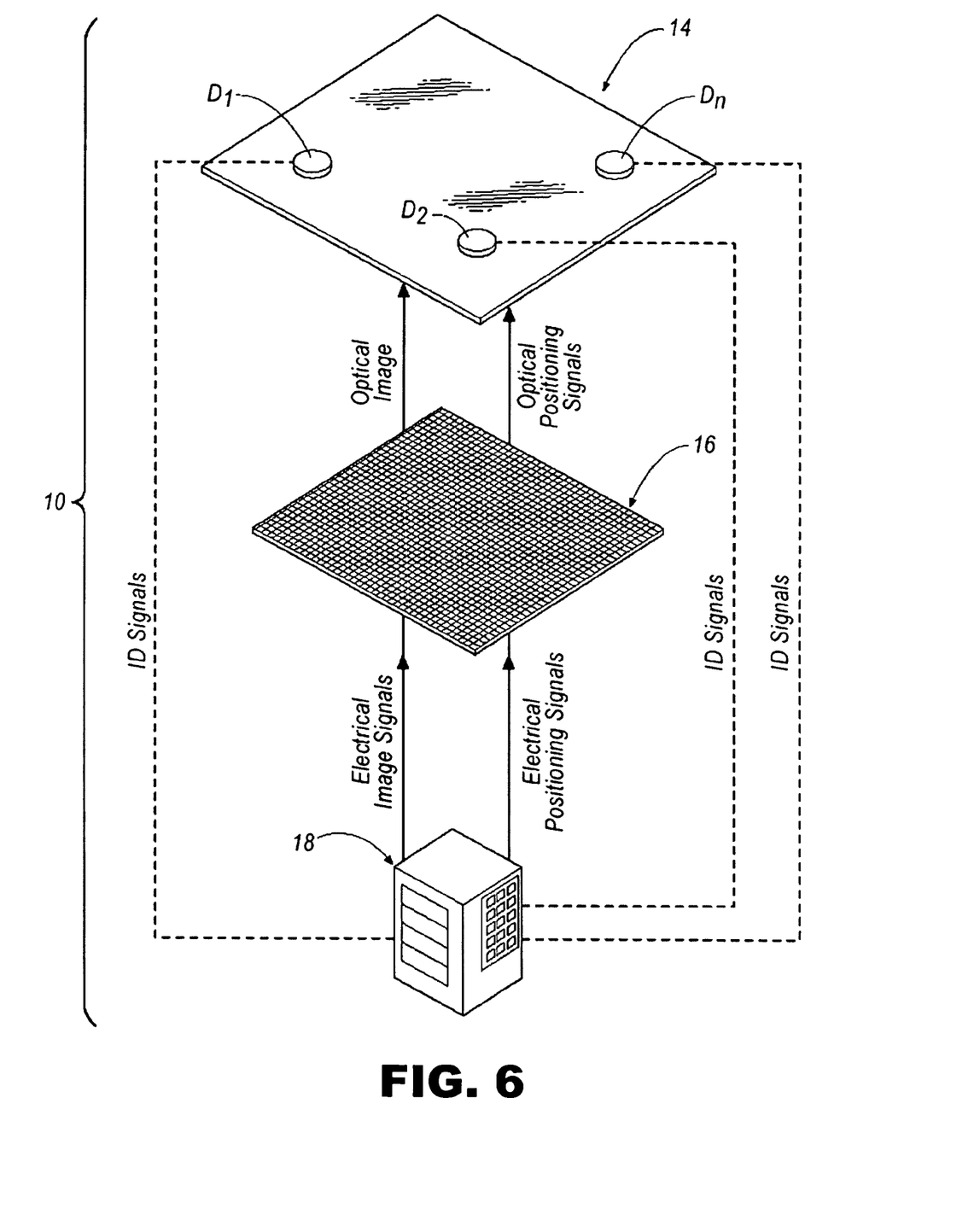
FIG. 6 is a logical schematic diagram illustrating the communication paths of the interactive display system, according to one exemplary embodiment.

As shown in FIG. 6, the interactive display system (10) facilitates two-way communication between the controller (18) and the data-receiving devices ($D_1$, $D_2$, $D_N$) by first identifying the position of input devices placed on the display surface (14). In particular, each data-receiving device ($D_1$, $D_2$, $D_N$) transmits identification signals to the controller (18) via its transmitters (60; FIG. 5). Accordingly, each data-receiving device ($D_1$, $D_2$, $D_N$) placed in contact with the display surface (14) receives signals from the controller (18) in the form of optical signals (optical positioning signals) that, in one embodiment, may be modulated via the DLP (16), which is controlled by electrical positioning signals and electrical image signals from the controller (18). As indicated above, the transmitter of each data-receiving device ($D_1$, $D_2$, $D_N$) can, in turn, send ID signals to the controller (18) via a variety of mechanisms, including, but in no way limited to, wireless RF, IR, or optical signals; hard-wiring; etc.

The optical positioning signals received by the data-receiving devices ($D_1$, $D_2$, $D_N$) are transmitted by the DLP (16). According to one exemplary embodiment, the optical positioning signals may be interspersed among visible optical images projected onto the display surface (14) in such a way that the optical signals are difficult to discern by the human eye. Thus, the visible image is not significantly degraded. For instance, where the DLP (16) includes a DMD device, a given micro-mirror of the DMD can be programmed to send a digital optical signal interspersed among the repetitive tilting of the micro-mirror that causes a particular color (or grey-scale) to be projected to the display surface for each image frame. While the interspersed optical signal may theoretically alter the color (or grey-scale) of that particular pixel, the alteration is generally so slight that it is difficult to detect by the human eye. Further, the interspersed optical signal may be used to transfer data to the data-receiving devices ($D_1$, $D_2$, $D_N$) at rates that far exceed the sampling rate of the human eye. The optical signal transmitted by the DMD may be in the form of a series of optical pulses that are coded according to a variety of encoding techniques.

Two-way communication between the controller (18) and each data-receiving device ($D_1$, $D_2$, $D_N$) allows the interactive display system (10) to accommodate simultaneous input from and output to multiple data-receiving devices. In one embodiment, two-way communication between the data-receiving devices ($D_1$, $D_2$, $D_N$) and the controller (18) allows the system to use a feed-back mechanism to establish a unique "handshake" between each data-receiving device and the controller. In particular in this embodiment, for each frame (still image) generated on the display surface (14), the DLP (16) projects subliminal optical positioning signals to the display surface to locate the data-receiving devices ($D_1$, $D_2$, $D_N$), and, in response, the data-receiving devices send feedback signals to the controller (18) to establish a "handshake" between each data-receiving device and the controller. This "handshake" process may occur for each frame of visible content produced on the display surface (14). In general for this embodiment, for each image frame, the controller (18) causes one or more subliminal optical signals to be projected onto the display surface (18), and the data-receiving devices ($D_1$, $D_2$, $D_N$) respond to the subliminal signals in such a way so that the controller is able to uniquely identify each of the input devices, thereby establishing the "handshake" for the particular frame.

The unique "handshake" can be accomplished in various ways. In one embodiment, the controller (18) can cause the DLP (16) to sequentially send out a uniquely-coded positioning signal to each pixel or group of pixels on the display surface (14). When the positioning signal is transmitted to the pixel (or group of pixels) over which the receiver of one of the data-receiving devices ($D_1$, $D_2$, $D_N$) is positioned, the device receives the optical positioning signal and, in response, transmits a unique ID signal to the controller (18) via its transmitter (60; FIG. 5). The ID signal uniquely identifies the particular data-receiving device ($D_1$, $D_2$, $D_N$) from which it was transmitted. When the controller (18) receives a unique ID signal from one of the data-receiving devices ($D_1$, $D_2$, $D_N$) in response to a positioning signal transmitted to a particular pixel, the controller (18) knows where that particular data-receiving device is positioned on the display surface (14). Specifically, the data-receiving device ($D_1$, $D_2$, $D_N$) is positioned over the pixel (or group of pixels) that projected the positioning signal when the data-receiving device sent its feedback ID signal to the controller (18). In this way, a feedback "handshake" is established between each of the data-receiving devices ($D_1$, $D_2$, $D_N$) on the display surface (14) and the controller (18). Thereafter, the controller (18) and data-receiving devices can communicate with each other for the remaining portion of the frame. This process can be repeated for each image frame. In this way, the position of each data-receiving device on the display surface (14) can be identified from frame to frame.

Several variations can be implemented with this methodology for establishing a "handshake" between the data-receiving devices ($D_1, D_N$) and the controller (18). For instance, the data-receiving devices ($D_1, D_N$) can project a visible or invisible signal (by a device such as an LED array) that may be detected by the controller (18) to establish the position of the data-receiving devices. Once the data-receiving devices are initially located on the display surface (14), the controller (18) may not transmit the positioning signal to all of the pixels (or groups of pixels) on the display surface in subsequent image frames. Alternatively, multiple different subliminal positioning signals can be projected to the display surface, each coded uniquely relative to each other. Multiple positioning signals would allow faster location of the data-receiving devices on the display surface.

Another method may include sending the positioning signal(s) to large portions of the display surface (14) at substantially the same time and sequentially narrowing the area of the display surface where the data-receiving device(s) ($D_1, D_2, D_N$) may be located. For example, the controller (18) could logically divide the display surface (14) in half and sequentially send a positioning signal to each of the screen halves. If the controller does not receive any "handshake" signals back from a data-receiving device in response to the positioning signal being projected to one of the screen halves, the controller "knows" that there is no data-receiving device positioned on that half of the display surface (14). Using this method, the display surface (14) can logically be divided up into any number of sections, and, using the process of elimination, the data-receiving devices can be located more quickly than by simply scanning across each row of the entire display surface. This method would allow each of the input devices to be located more quickly in each image frame.

In another embodiment, once each of the input devices are affirmatively located on the display surface (14), the controller (18) could cause the DLP (16) to stop projecting image content to the pixels on the display surface under the data-receiving devices ($D_1, D_2, D_N$). Image content may not be projected to those pixels because the data-receiving devices ($D_1, D_2, D_N$) would be covering these pixels anyway (and thus may be non-viewable by a human user). With no image content, all of the pixels under each of the input devices could be used continuously to transmit data to the input device and the controller could transmit higher amounts of data in the same time frame.

Figure 7:
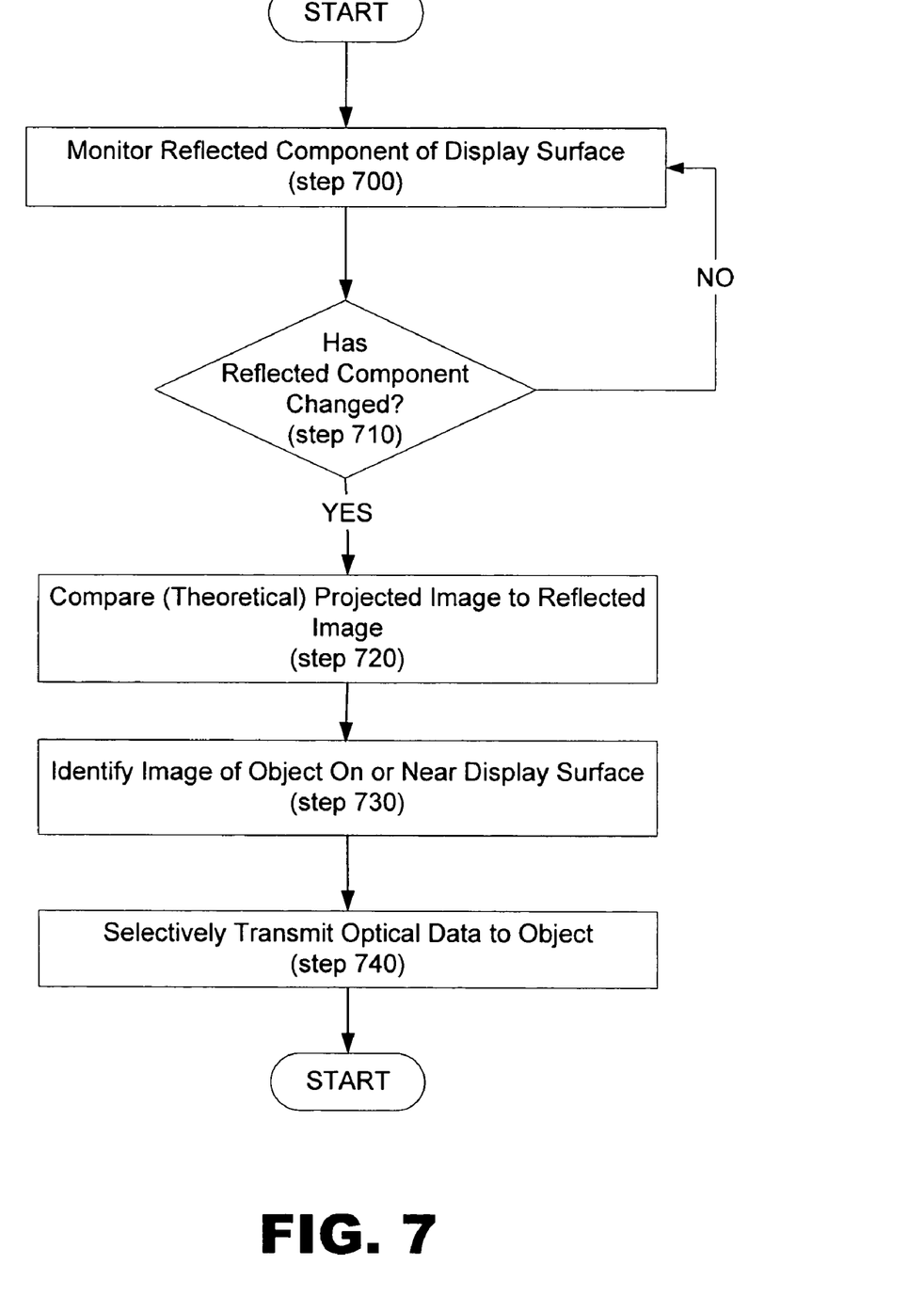
FIG. 7 is a flow chart illustrating an exemplary method for detecting the presence of a data-receiving device on an interactive display system, according to one exemplary embodiment.

Alternatively, detecting the presence of a data-receiving device ($D_1, D_2, D_N$) on the display surface (14) may be performed according to an image comparison method, as illustrated in FIG. 7. As shown in FIG. 7, one exemplary image comparison method begins by monitoring the reflected component of the display surface (step 700). More specifically, according to one exemplary embodiment, the display surface (14; FIG. 1) will reflect a portion of the digital optical (viewable) images generated on the display surface. This reflected portion of the digital optical image may then be detected by a photo receptor such as a photocell, a photo diode, a charge coupled device (CCD), or any other optical sensing device (36; FIG. 2).

During the monitoring of the reflected component of the digital optical image (step 700), the detected optical signals will be analyzed for changes in the reflected component of the digital optical image (step 710). According to one exemplary embodiment, analyzing the reflected optical signals for periodic changes includes comparing received optical images with previously received optical images on a pixel by pixel basis to detect changes in the optical images. Detecting changes of the reflected component may indicate the presence of a new data-receiving device ($D_1, D_2, D_N$) on the display surface (14; FIG. 1) or movement of an existing data-receiving device on the display surface. More specifically, placement of a data-receiving device ($D_1, D_2, D_N$) on the display surface (14; FIG. 1) will alter the reflected component of the digital optical image by varying the optical reflectance of the display surface. The corresponding variation of the reflected component of the digital optical image may then be used to identify the presence of a data-receiving device ($D_1, D_2, D_N$) or other object.

According to the exemplary embodiment illustrated in FIG. 7, if no changes in the reflected component of the digital optical image are sensed by the present exemplary system (NO; step 710), the system concludes that no new data-receiving device ($D_1, D_2, D_N$) is present on the display surface (14; FIG. 1) and no existing data-receiving device ($D_1, D_2, D_N$) has been moved. Consequently, the system will continue to monitor the reflected component of the display surface (step 700). If, however, the present exemplary system senses a change in the reflected component of the digital optical image (YES, step 710), the system will compare the theoretical projected image with the reflected component of the digital optical image (step 720). According to one exemplary embodiment, comparing the theoretical projected image with the reflected component of the digital optical image (step 720) may include, but is in no way limited to, comparing the geometry, the color, and/or the illumination of the reflected component of the digital optical image to the original or theoretical projected image.

According to one exemplary embodiment illustrated in FIG. 7, comparing the theoretical projected image to the reflected component of the digital optical image (step 720) allows the present system to determine the location of the data-receiving device ($D_1, D_2, D_N$) on the display surface (14; FIG. 1). Once the location of the data-receiving device ($D_1, D_2, D_N$) has been determined, the present image comparison method illustrated in FIG. 7 identifies and/or isolates the image of the detected object that is on or near the display surface (step 730). According to one exemplary embodiment, the identification and/or isolation of the detected object is performed according to any number of image comparison methods. According to one exemplary embodiment, the image comparison method used to identify and/or isolate the detected object includes performing an image comparison that removes matching background images while keeping the varying portions of the optically sensed image, which correspond to data-receiving devices ($D_1, D_2, D_N$), for identification and/or isolation.

Once the locations of the data-receiving device ($D_1, D_2, D_N$) have been identified, as illustrated above, optical data may be selectively transmitted thereto, as explained in detail below with reference to FIG. 8.

Figure 8:
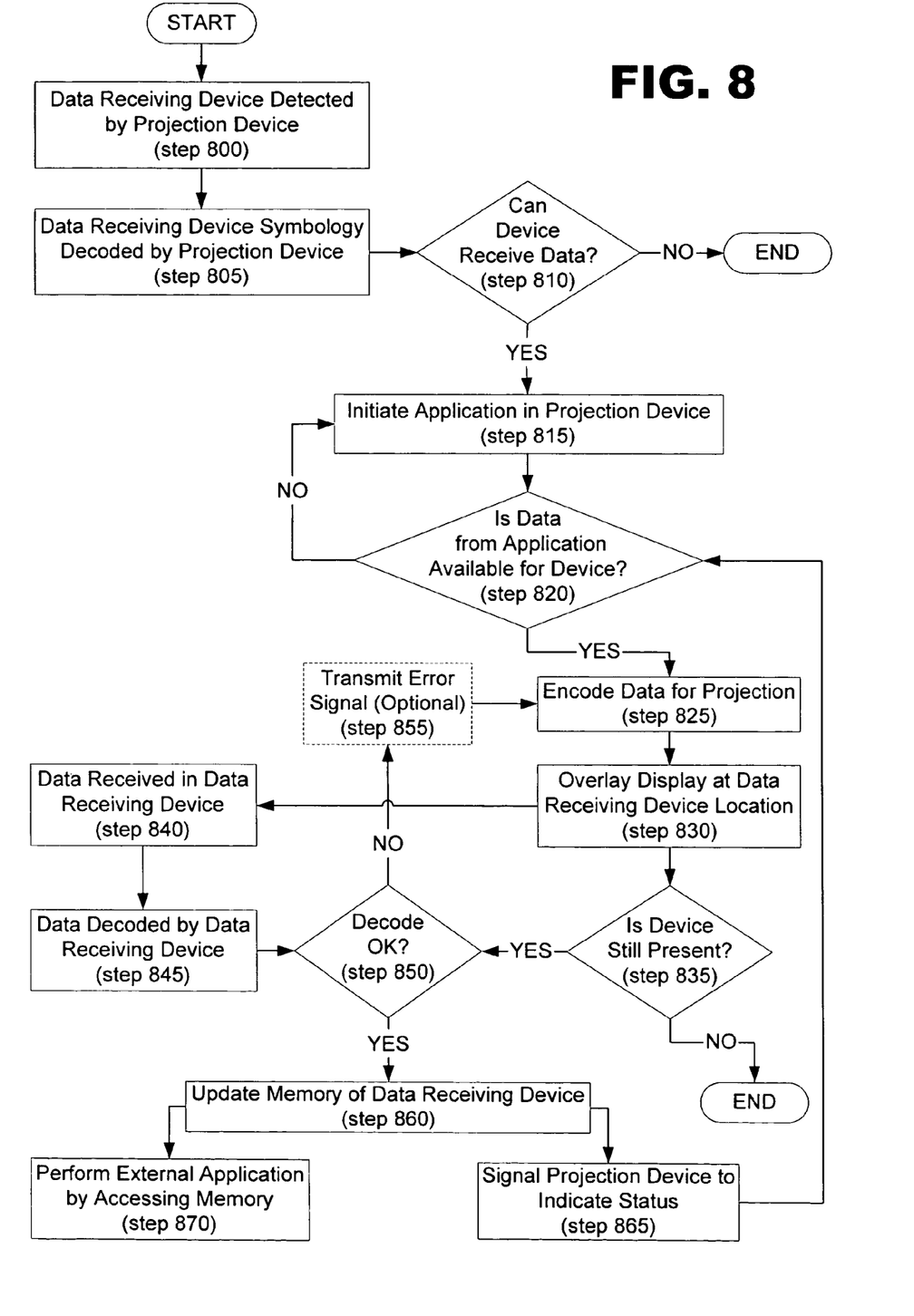
FIG. 8 is a flow chart illustrating an exemplary method for transmitting data to a data-receiving device from an interactive display system, according to one exemplary embodiment.

FIG. 8 illustrates an exemplary method for transmitting optical data to a data-receiving device through a display surface. As illustrated in FIG. 8, the exemplary method begins by first detecting the position of any data-receiving devices placed on the display surface (step 800). Detection and position identification of data-receiving devices placed on the display surface (step 800) may be performed as previously described with reference to FIGS. 6 and 7 above.

Once the data-receiving device has been detected, the data-receiving symbology associated with the data-receiving device is decoded by the projection device (step 805). According to one exemplary embodiment, each data-receiving device ($D_1$, $D_2$, $D_N$; FIG. 6) includes symbology signals when it sends ID signals to the controller (18). The symbology signals include a number of symbols representing encoded numbers, letters, special character control characters, or a combination thereof that indicate a number of characteristics associated with the data-receiving device ($D_1$, $D_2$, $D_N$; FIG. 6) including, but in no way limited to, device type, device functionality, and/or programs and applications associated with the data-receiving device. As the symbology signals are decoded by the projection device (805), the projection device may determine whether the data-receiving device ($D_1$, $D_2$, $D_N$; FIG. 6) is capable of receiving optical data signals (step 810).

If the data-receiving device ($D_1$, $D_2$, $D_N$; FIG. 6) is not capable of receiving optical data signals (NO, step 810), the present data transmission method ends with respect to that data-receiving device ($D_1$, $D_2$, $D_N$; FIG. 6). If, however, it is determined from the symbology signals that the data-receiving device ($D_1$, $D_2$, $D_N$; FIG. 6) is capable of receiving optical data signals (YES, step 810), the present method continues by initiating an application in the projection device (step 815).

As mentioned previously, the symbology signals provide a number of characteristics associated with the data-receiving device ($D_1$, $D_2$, $D_N$; FIG. 6) including, but in no way limited to, device type, device functionality, and/or programs and applications associated with the data-receiving device. When it is determined that the data-receiving device ($D_1$, $D_2$, $D_N$; FIG. 6) is capable of receiving optical data signals (YES, step 810), one or more applications associated with the identified data-receiving device are initiated by the controller (step 815).

Once the one or more applications are initiated (step 815), the controller (18; FIG. 2) determines whether there is data available from the application to be transmitted to the data-receiving device (step 820). If it is determined that there is no available data in the selected application to transmit to the identified data-receiving device (NO, step 820), the processor (18; FIG. 2) returns to open another application identified with the data-receiving device (step 815).

If, however, it is determined that the selected application contains data available to be transmitted to the data-receiving device (YES, step 820), the available data is encoded in preparation for projection by the interactive display system (10). Encoding the data for projection includes converting the data to be transmitted to the data-receiving device ($D_1$, $D_2$, $D_N$; FIG. 6) into DLP (16) control commands.

Once encoded (step 825), the data is overlaid on the pixels corresponding with the identified data-receiving device location (step 830). That is, once the data to be transmitted is encoded, it is transmitted by the DLP (16). However, the encoded data is not transmitted to all of the pixels on the display surface (14). Rather in this embodiment, the DLP (16) selectively transmits the encoded data using the pixels directly opposite the data-receiving device ($D_1$, $D_2$, $D_N$; FIG. 6), as identified by the process illustrated in FIG. 6. According to the present exemplary system and method, the ability to overlay the encoded data onto the pixels corresponding to the identified data-receiving device location, allows multiple data-receiving devices ($D_1$, $D_2$, $D_N$; FIG. 6) to simultaneously receive data while enhancing the security of the data transfer because the data-receiving device will at least substantially cover the data stream during transmission. As noted previously, that data is optically transmitted by selectively varying the micro-mirrors (24) of the DLP (16; FIG. 2).

After the data is transmitted by the DLP (step 830), the data-receiving device ($D_1$, $D_2$, $D_N$; FIG. 6) receives the optical data (step 840). As mentioned previously, each of the data-receiving devices ($D_1$, $D_2$, $D_N$; FIG. 6) includes a receiver (40) configured to sense and receive the optically transmitted data from the DLP (16; FIG. 2). Once received, the decoder (52; FIG. 5) decodes the optically received data (step 845).

After the data is decoded (step 845), the data-receiving device ($D_1$, $D_2$, $D_N$; FIG. 6) determines whether the decoder (52; FIG. 5) properly decoded the data. According to one exemplary embodiment, the data transmitted may include a checksum used to confirm a proper decoding of the data. If the data-receiving device ($D_1$, $D_2$, $D_N$; FIG. 6) determines that the data was not properly decoded (NO, step 850), an optional error signal may be transmitted (step 855) to the error signal indicator (56; FIG. 5) and the data may be re-encoded for projection (step 825) and transmitted (step 830) to the data-receiving device ($D_1$, $D_2$, $D_N$; FIG. 6).

If, however, the data-receiving device ($D_1$, $D_2$, $D_N$; FIG. 6) determines that the data was properly decoded (YES, step 850), the data may be used to update the memory (44; FIG. 5) of the data-receiving device (step 860). According to one exemplary embodiment, the memory of the data-receiving device is updated by the data being processed by a command parser (54; FIG. 5) and the memory access component (42; FIG. 5). According to this exemplary embodiment, the decoded data is passed through the command parser (54; FIG. 5) where all of the processing commands are extracted and used by the memory access processor or circuit to store the received data in memory (46; FIG. 5).

A device presence check (step 835) is also performed throughout the present method during transmission of data from the interactive display system (10) to the data-receiving device ($D_1$, $D_2$, $D_N$; FIG. 6). By performing device presence checks (step 835) during the transmission of data from the interactive display system (10; FIG. 1) and the data-receiving device ($D_1$, $D_2$, $D_N$; FIG. 6), the present system is assured that the data is being received by the identified data-receiving device ($D_1$, $D_2$, $D_N$; FIG. 6) and not an unintended receiver. Additionally, when it is sensed that the data-receiving device ($D_1$, $D_2$, $D_N$; FIG. 6) is no longer present, the DLP (16; FIG. 2) will cease transmission.

Once the memory component (44; FIG. 5) of the data-receiving device ($D_1$, $D_2$, $D_N$; FIG. 6) has been successfully updated with the transmitted information (step 860), the data-receiving device may transmit a status signal to the interactive display system (step 865), indicating successful receipt of the data and requesting additional data if present in the current application (step 820). Additionally, successful receipt of the data (step 860) may initiate a signal being sent to the acknowledge indicator (58; FIG. 5) to display a visual indicator signaling that the data has been successfully received.

Once the data has been saved in the memory component (step 860), it may be accessed therefrom by an external application or device (step 870). By way of example only, songs may be heard from the memory of an MP3 player once the music data has been saved thereon by coupling earphones to the external access components (46; FIG. 5) of the MP3 player.

As mentioned previously, the interactive display system (10; FIG. 1) is configured to simultaneously transmit optical data to a plurality of data-receiving devices ($D_1$, $D_2$, $D_N$; FIG. 6). The ability to allow multiple data-receiving devices to simultaneously receive and transmit data to and from the interactive display system (10; FIG. 1) has a variety of applications. For example, the interactive display system (10; FIG. 1) can be used for interactive video/computer gaming, where multiple game pieces (data-receiving devices) can communicate with the system simultaneously. In one gaming embodiment, the display surface (14; FIG. 1) may be set up as a chess board with thirty two data-receiving devices ($D_1$, $D_2$, $D_N$; FIG. 6), each device being one of the chess pieces. The described interactive display system (10; FIG. 1) allows each of the chess pieces to communicate with the system simultaneously, allowing the system to track the moves of the pieces on the board. In another embodiment, the display surface (14; FIG. 1) can be used as a collaborative download surface, where multiple data-receiving devices ($D_1$, $D_2$, $D_N$; FIG. 6) may simultaneously download files or be synchronized through optical data transmitted from the interactive display system (10; FIG. 1).

In another embodiment, the interactive display system (10; FIG. 1) can be used such that multiple users can access the resources of a single controller (such as a personal computer, including its storage disk drives and its connection to the Internet, for example) through a single display surface (14; FIG. 1) to download data and perform separate tasks. For example, an interactive display system (10; FIG. 1) could be configured to allow each of several users to access different audio files with multiple MP3 players on a single personal computer through a single display surface (14; FIG. 1). For instance, the "table" (12) of FIGS. 1 and 2 could be configured to allow four users to access the Internet independently of each other through a single personal computer device and a single display surface (14; FIG. 1) embedded in the "table." Each user could carry on their own separate activities on the display surface (14; FIG. 1) through their own respective input devices (such as computer mice, MP3 players, personal digital assistants (PDA)). The four different "activities" (downloading music files, Web pages, spreadsheets, video displays, etc.) could be performed at four different locations on the same display surface (14; FIG. 1). In this way, multiple users can share a single controller (personal computer), a single image projection system (digital light processor) (16; FIG. 2) and a single display surface (14; FIG. 1) in a group setting (all users sitting around a "table"), while each user downloads on his/her own data to his/her own respective data-receiving devices disposed on the common display surface.

In some embodiments, it may be useful for the various data-receiving devices ($D_1$, $D_2$, $D_N$; FIG. 6), positioned on the display surface (14; FIG. 2) to communicate with each other. This can be accomplished by communicating from one data-receiving device ($D_1$, $D_2$, $D_N$; FIG. 6) to another through the display surface (14; FIG. 2). Specifically, once the various data-receiving devices ($D_1$, $D_2$, $D_N$; FIG. 6) are identified and located on the display surface (14; FIG. 2), a first data-receiving device ($D_1$; FIG. 6) can transmit data information to the controller (18; FIG. 2) via its transmitter (60; FIG. 5), and the controller, in turn, can relay that information to a second data-receiving device ($D_2$; FIG. 6) optically, as described hereinabove. The second data-receiving device ($D_2$; FIG. 6) can then respond to the first data-receiving device ($D_1$; FIG. 6) through the controller (18; FIG. 2) in similar fashion.

The preceding description has been presented only to illustrate and describe exemplary embodiments of the system and method. It is not intended to be exhaustive or to limit the system and method to any precise form disclosed. Many modifications and variations are possible in light of the above teaching. It is intended that the scope of the system and method be defined by the following claims. Where the claims recite "a" or "a first" element of the equivalent thereof, such claims should be understood to include incorporation of one or more such elements, neither including nor excluding two or more such elements.

What is claimed is:

1. A display system, comprising:
   a display device configured to output a display comprising, substantially simultaneously, image pixels and an optical signal encoding data, wherein said optical signal comprises modulated optical pulses produced using selected pixels of the display device; and
   at least one optical data-receiving device configured to receive said optical signal when located at said display and decode said data of said optical signal.

2. The display system of claim 1, wherein said at least one optical data-receiving device further comprises a transmitter configured to transmit information to a controller.

3. The display system of claim 2, wherein said at least one optical data-receiving device is configured to transmit said information via one of optical signals, infrared signals, radio frequency signals, or hard wires.

4. The display system of claim 1, wherein said at least one optical data-receiving device further comprises:
   a memory configured to store data associated with said encoded optical signal; and
   an external access configured to facilitate a retrieval of said data from said memory.

5. The display system of claim 4, wherein said external access comprises one of an earphone jack, a speaker jack, an infrared transmitter, a radio frequency transmitter, a speaker, a motion actuator, a light source, a keystone jack, a universal serial bus (USB) port, or a serial port.

6. The display system of claim 1, wherein said display system is configured to sense when said at least one optical data-receiving device is near said display.

7. The display system of claim 6, wherein said display system is configured to sense the presence of said at least one optical data-receiving device via an image comparison method.

8. The display system of claim 6, wherein said display system is further configured to determine a number of pixels on said display that correspond to a position of said at least one optical data-receiving device.

9. The display of claim 8, wherein said projection of optical signal encoding data is upon said display pixels that correspond to a position of said at least one optical data-receiving device.

10. The display system of claim 1, wherein said display device comprises one of a digital light processor or a liquid crystal display.

11. The display system of claim 1, wherein said display device comprises one of a diffractive light device (DLD), a liquid crystal on silicon device (LCOS), a plasma display, or a liquid crystal display.

12. The display system of claim 1, further comprising a controller configured to cause said display device to project said optical signal encoding data to said display.

13. The display system of claim 1, further comprising a plurality of optical data-receiving devices, each data-receiving device being configured to receive said optical signal encoding data from said display;
   wherein said display device is configured to simultaneously provide said optical signal encoding data to a plurality of said optical data-receiving devices.

14. The display system of claim 13, wherein each of said optical data-receiving devices is configured to transmit an identification signal to a controller in response to said optical data-receiving device receiving a positioning signal from said projection device;

said identification signal being configured to identify respective said optical data-receiving device.

15. The display system of claim 14, wherein said identification signal is further configured to identify an application associated with said respective data-receiving device.

16. The display system of claim 1, wherein said optical data-receiving device comprise one of an MP3 player, a digital camera, a personal digital assistant (PDA), a mouse, a whiteboard pen, or a gaming piece.

17. The display system of claim 1, further comprising a controller configured to drive said projection device and communicate with a plurality of optical data-receiving devices disposed on said display.

18. The display system of claim 1, wherein said display device comprises:

a display surface; and a projection device being configured to project, substantially simultaneously, image pixels through said display surface and said optical signal encoding data through said display surface.

19. A display system, comprising:

a means for displaying a pixilated image;

a means for locating a data-receiving device with respect to said image; and after said location of said data-receiving device is determined, a means for digitally modulating light produced by at least one of said pixels of said image corresponding to said location of said data-receiving device so as to deliver digital data to said data-receiving device.

20. The display system of claim 19, wherein said data-receiving device further comprises a means for transmitting a signal including information to a controller.

21. The display system of claim 20, wherein said data-receiving device is configured to transmit an identification signal to said controller.

22. The display system of claim 21, wherein said identification signal is further configured to identify an application associated with said data-receiving device.

23. The display system of claim 19, wherein said means for displaying a pixilated image comprises one of a diffractive light device (DLD), a liquid crystal on silicon device (LCOS), a plasma display, or a liquid crystal display.

24. The display system of claim 19, wherein said data-receiving device further comprises:

a memory configured to store data received; and an external access configured to facilitate a retrieval of said data from said memory.

25. A method, comprising:

locating a device on a display surface; and projecting optical signals to said device through said display surface, wherein said optical signals transmits encoded data; and decoding said data in said device.

26. The method of claim 25, wherein said step of projecting optical signals to said device comprises projecting encoded optical signals in the form of modulated light pulses.

27. The method of claim 25, wherein said device comprises a data receiving device.

28. The method of claim 27, wherein said step of identifying said device comprises:

transmitting a positioning signal onto said display surface; and receiving a feedback signal transmitted by said device, said feedback signal identifying said device, an application associated with said device, and a position of said device.

29. The method of claim 28, further comprising:

initiating said application associated with said device;

identifying data to be transmitted to said device; and transmitting said identified data to said device.

30. The method of claim 29, wherein said step of transmitting said identified data comprises:

identifying a plurality of pixels on said display surface associated with a position of said device; and substantially limiting said transmission of data to said identified pixels.

31. The method of claim 30, further comprising simultaneously transmitting data to a plurality of devices.

32. The method of claim 25, wherein said step of identifying said device comprises:

monitoring a reflective component of said display surface;

identifying areas of change in a reflective characteristic of said display surface; and performing an image comparison method on said identified areas of change.

* * * * *

UNITED STATES PATENT AND TRADEMARK OFFICE
CERTIFICATE OF CORRECTION

| | | |
|---|---|---|
| PATENT NO. | : 7,898,505 B2 | Page 1 of 1 |
| APPLICATION NO. | : 11/003726 | |
| DATED | : March 1, 2011 | |
| INVENTOR(S) | : Michael M. Blythe et al. | |

It is certified that error appears in the above-identified patent and that said Letters Patent is hereby corrected as shown below:

In column 12, line 45, in Claim 9, after "display" insert -- system --.

Signed and Sealed this
Fifth Day of July, 2011

David J. Kappos
*Director of the United States Patent and Trademark Office*